US012750252B2

(12) United States Patent
Grigoropoulos et al.

(10) Patent No.: US 12,750,252 B2
(45) Date of Patent: Sep. 29, 2026

(54) METHOD AND SYSTEM FOR AUTOMATIC MEETING SWAP BETWEEN DEVICES

(71) Applicant: Unify Beteiligungsverwaltung GmbH & Co. KG, Munich (DE)

(72) Inventors: Charalampos Grigoropoulos, Athens (GR); Katerina Ioannidou, Melissia (GR); Michael Brochonski, Curitiba (BR); Michail Sdrallis, Chalandri (GR); Nikolaos Ploumitsakos, Maroussi (GR)

(73) Assignee: UNIFY BETEILGUNGSVERWALTUNG GmbH & CO. KG, Munich (DE)

( * ) Notice: Subject to any disclaimer, the term of this patent is extended or adjusted under 35 U.S.C. 154(b) by 78 days.

(21) Appl. No.: 18/969,736

(22) Filed: Dec. 5, 2024

(65) Prior Publication Data

US 2025/0193035 A1 Jun. 12, 2025

(30) Foreign Application Priority Data

Dec. 8, 2023 (EP) .................................... 23215273

(51) Int. Cl.
*G06F 21/32* (2013.01)
*H04L 12/18* (2006.01)

(52) U.S. Cl.
CPC .......... *H04L 12/1827* (2013.01); *G06F 21/32* (2013.01)

(58) Field of Classification Search
CPC ............. H04L 12/1827; H04L 12/1818; H04L 12/1822; G06F 21/32; G06F 21/33
USPC .......................................................... 709/204
See application file for complete search history.

(56) References Cited

U.S. PATENT DOCUMENTS

| | | | | |
|---|---|---|---|---|
| 7,187,764 | B2 | 3/2007 | Ruetschi | |
| 8,718,253 | B2 | 5/2014 | Sharland et al. | |
| 9,674,365 | B2 | 6/2017 | Gilg et al. | |
| 9,906,649 | B2 | 2/2018 | Lederer | |
| 10,219,124 | B2 | 2/2019 | Garbin et al. | |
| 10,250,661 | B2 | 4/2019 | Totzke et al. | |
| 10,498,779 | B2 * | 12/2019 | Rist .................... | H04M 3/4288 |
| 10,681,090 | B2 | 6/2020 | Horvath | |
| 10,819,765 | B2 | 10/2020 | Hutton | |
| 11,146,687 | B2 | 10/2021 | Smith | |
| 11,336,474 | B2 | 5/2022 | Schmitz | |

(Continued)

FOREIGN PATENT DOCUMENTS

CN 110493556 A * 11/2019 ......... H04L 12/1822

OTHER PUBLICATIONS

Extended European Search Report for European Application No. 23215273.6 dated May 6, 2024.

*Primary Examiner* — Ruolei Zong
(74) *Attorney, Agent, or Firm* — Buchanan Ingersoll & Rooney PC

(57) ABSTRACT

A method and system for collaboration session swap between at least two devices of a user and a system for performing said method can be configured to offer an efficient and secure method of unlocking a device and transferring a session, enhancing the overall user experience with a collaboration tool. In some embodiments, a session transfer request for transferring a collaboration session from a second device to a first device can be sent to facilitate transferring of the collaboration session after the first device is unlocked so a session can be seamlessly transferred to the first device.

19 Claims, 4 Drawing Sheets

(56) References Cited

U.S. PATENT DOCUMENTS

| | | | | |
|---|---|---|---|---|
| 2012/0019361 | A1* | 1/2012 | Ben Ayed | H04W 12/068 340/5.83 |
| 2012/0084364 | A1 | 4/2012 | Sivavakeesar | |
| 2012/0232367 | A1* | 9/2012 | Allegri | G16H 40/20 600/365 |
| 2013/0212286 | A1* | 8/2013 | Krishnakumar | H04L 65/1066 709/227 |
| 2014/0087705 | A1* | 3/2014 | Wooster | H04W 4/16 455/41.1 |
| 2014/0359709 | A1* | 12/2014 | Nassar | H04L 65/1083 726/4 |
| 2015/0039511 | A1* | 2/2015 | Genovez | G06Q 20/3278 705/44 |
| 2016/0134428 | A1* | 5/2016 | Ouyang | H04L 69/24 709/204 |
| 2021/0250329 | A1 | 8/2021 | Klaghoffer et al. | |
| 2021/0400142 | A1* | 12/2021 | Jorasch | H04M 3/567 |
| 2022/0256001 | A1* | 8/2022 | Inamdar | H04L 65/403 |
| 2024/0353922 | A1* | 10/2024 | Dedonato | G06T 13/80 |

* cited by examiner

METHOD AND SYSTEM FOR AUTOMATIC MEETING SWAP BETWEEN DEVICES

CROSS-REFERENCE TO RELATED APPLICATIONS

The present application claims priority to European Patent Application No. 23 215 273.6, filed on Dec. 8, 2023 (which may also be referred to as European Patent Application No. 23 215 273). The entirety of this application is incorporated by reference herein.

FIELD

The present invention relates to a method for meeting swap between at least two devices of a user and a system for performing said method.

BACKGROUND

Online conferences are widely used in various fields, including business, education, healthcare, technology, and more, to connect professionals, share knowledge, collaborate, and reach a global audience. They have become especially popular for their flexibility, cost-effectiveness, and accessibility, particularly when physical gatherings are limited or not feasible. A user of an online conference may utilize a plurality of different Internet-enabled devices that he/she may want to switch between during an online conference. For the swapping of devices to work, the devices have to be unlocked, otherwise, it will not be possible for the user to access the conference or collaboration content.

SUMMARY

There can be different methods for unlocking a computer device, like using biometric information and voice commands. Also, the transfer of a call from one device to another is described. Further, collaboration tools may allow device swapping, but they usually require manual logins when switching between devices. We determined that there is a need to not only unlock a device but also to automatically swap the conference from one device to another in a single, seamless action.

Therefore, Embodiments of a device, a system, an apparatus, and a process can be based on an object to provide for automatic meeting swap between devices. Embodiments can be configured to facilitate other design objectives as well.

A user may have a plurality of devices where a collaboration tool is accessible from, either as an application or a web application via a web browser.

The different devices of the user can include a personal computer (PC), a laptop computer, a smartphone, a mobile phone, a tablet, a smart speaker, smart watches, smart cars and/or a personal digital assistant (PDA).

A collaboration session, online conference, conference call and meeting are used interchangeably for a collaborative meeting, presentation, seminar, or event conducted over at least one communication network (e.g. the internet) using digital communication tools and technologies.

In the meaning of the present invention, a collaboration tool is a software or platform that enables users or groups to work together, communicate, and share information efficiently and effectively in a collaborative manner. These tools are designed to facilitate and streamline various aspects of teamwork, such as document sharing, real-time editing, task management, communication, and project coordination. Collaboration tools can range from simple applications like email and instant messaging to more advanced platforms like project management software, video conferencing tools, and cloud-based document storage systems. They can help enhance productivity and communication among team members, whether they are working in the same physical location or remotely.

In the meaning of the present invention, transferring a collaboration session involves sending real-time data, such as video and/or audio from said conference call. This may be accomplished using real-time communication protocols such as WebRTC (Web Real-Time Communication) or RTP (Real-time Transport Protocol). To transfer session data, it may be serialized, or converted into a format that can be sent over a network. This may be accomplished using technologies like JSON (JavaScript Object Notation) or XML (eXtensible Markup Language). The session data can be securely transferred to protect it from interception. This can be accomplished using secure communication protocols such as HTTPS (Hypertext Transfer Protocol Secure), or by encrypting the data using encryption standards like AES (Advanced Encryption Standard).

A method for automatic meeting swap can be provided. Embodiments of the method can include: initiating, by a first device of a user, a collaboration session; transferring, by a collaboration tool, the collaboration session to a second device of the user; locking, by an operating system (OS) of the first device, the first device; registering, by the OS, the collaboration tool with a device key; unlocking, by the OS, the first device; triggering, by the collaboration tool, a transfer request for transferring the collaboration session from the second device to the first device; verifying, by the collaboration tool, the transfer request; transferring, by the collaboration tool, the collaboration session from the second device back to the first device, in case the transfer request is verified; continuing, by the user, the collaboration session on the first device.

The first device can be a type of computer device and the second device can also be a type of computer device. Each of these devices can include hardware. The hardware can include a processor connected to non-transitory memory and at least one transceiver. The OS and the collaboration tool can be defined by code stored in the memory of the device that can be run by the processor of the device. The collaboration session can be a communication session that can be transferred from the user's first device to the user's second device can be a video call, a video conference, an audio call, an audio conference, or other type of collaboration session. Such a session can include communications exchanged with other devices of other users that may be hosted by a host device that is connectable to the devices of the session participants via at least one network. The host device can be a type of computer device (e.g. a conference call server, a video conference server, a collaboration session hosting device, etc.). The host device can include a processor connected to non-transitory memory and at least one transceiver and be configured to facilitate the communications between the devices of the participants for the session.

According to a preferred embodiment, unlocking of the first device can be performed by the user himself/herself.

According to another preferred embodiment, the unlocking of the first device can be performed using a biometric unlocking mechanism using biometric features of the user. Preferably, biometric features are selected from facial recognition, fingerprint scan, iris scan, retina scan, hand geometry, ear recognition, palm vein recognition, finger vein recognition, voice recognition, and/or gait recognition.

According to still another preferred embodiment, the biometric unlocking mechanism is built-in the first device.

According to still another preferred embodiment, voice recognition is additionally performed with an action of the user. Preferably, the user action is selected from pressing one or more key(s), moving the mouse, moving a pointer device, swiping, tapping on a touch screen, rotating a device, clicking with mouse buttons, gesturing with hand or fingers, blinking the eyes, and/or tilting the device.

According to yet another preferred embodiment, microphones that are not involved in the unlocking of one of the devices of the user, are muted during the step of unlocking said device.

By initiating the unlocking, the device being activated may send a command through the collaboration tool's application programming interface (API) to mute all other devices. This can help ensure that there are no audio disturbances or feedback loops, and the user's voice command to unlock said device may not be broadcasted to the other conference participants.

According to still another preferred embodiment, the step of unlocking the first device can be performed using the second device's biometric unlocking mechanism on the first device.

Further, according to another preferred embodiment, a secure communication channel can be identified for transferring the collaboration session.

According to still another preferred embodiment, the secure communication channel is a local channel, preferably Wi-Fi or Bluetooth.

According to yet another aspect of the present invention, a system is provided, which is adapted to perform the method.

According to a preferred embodiment, the system comprises at least two devices, a collaboration tool, and one or more interface(s).

According to yet another preferred embodiment, the one or more interface(s) includes the API. The API can be a set of pre-defined rules and/or protocols that allows different software applications to communicate with each other. APIs define the methods and data formats that developers can use to request and exchange information between software systems, services, or components, often across different platforms or environments.

Embodiments can also include a device, apparatus, or system that can be configured to perform an embodiment of the method. The system can include at least the first user device and the second user device. Each user device can utilize one or more collaboration tools and/or one or more interfaces for the transferring of a collaboration session from the first user device to the second user device, for example.

Embodiments can be configured to help ensure a secure session transfer between devices and can enhance the user experience by enabling biometric unlock mechanisms to trigger session transfers. In particular, unlocking of the devices and capturing of the active session in the collaboration tool can be performed in a single seamless action.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed.

BRIEF DESCRIPTION OF THE DRAWINGS

The invention and embodiments thereof will be described below in further detail in connection with the drawing(s). Like reference numerals can refer to like components.

Figure 1:
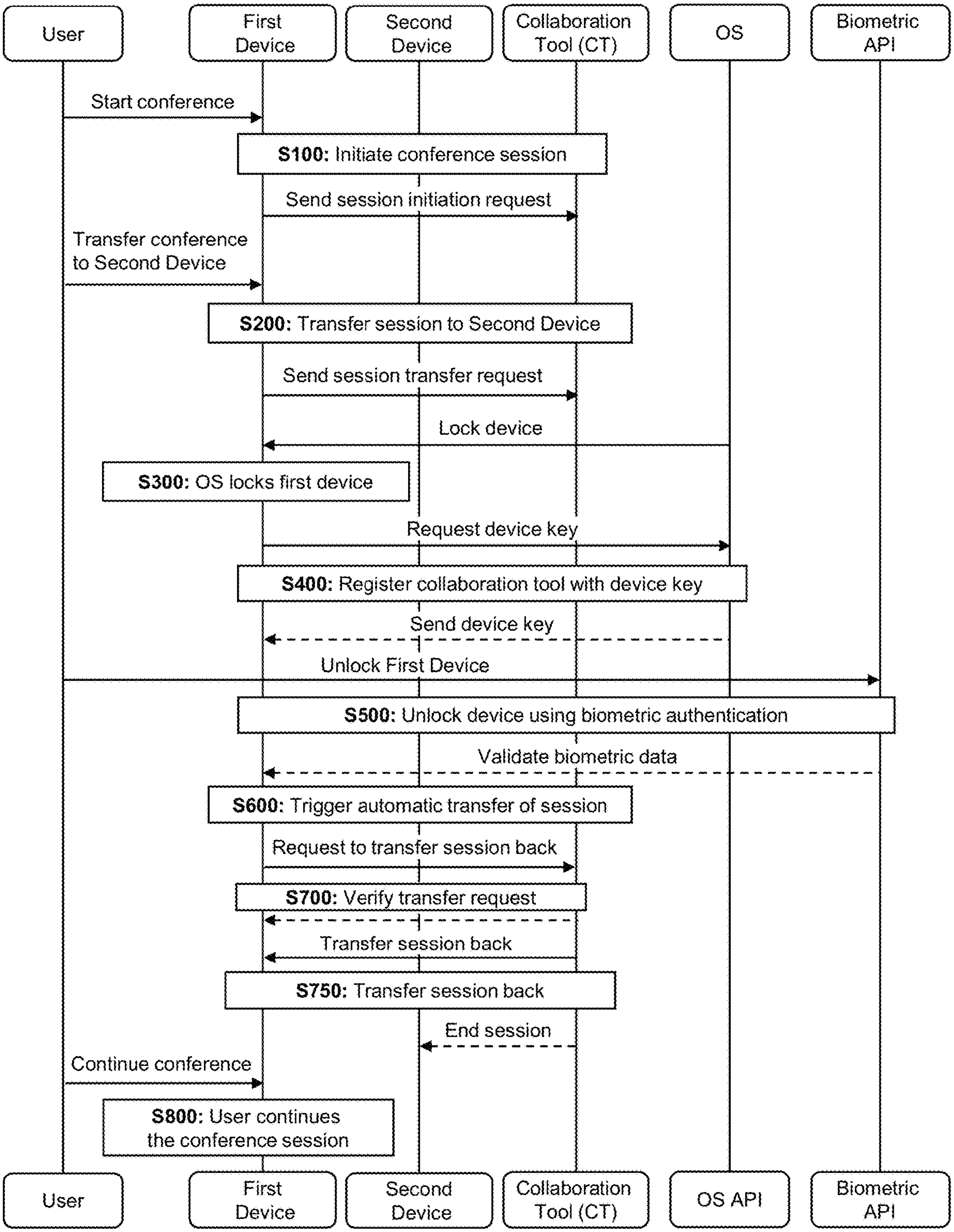
FIG. 1 shows a schematic sequence diagram of the method for automatic meeting swap according to an embodiment of the invention.

Reference numerals utilized in the drawings include:

| | |
|---|---|
| S100 to S800 | method steps |
| OS | operating system |
| API | application programming interface |
| CT | collaboration tool |
| HTTPS | Hypertext Transfer Protocol Secure |

DETAILED DESCRIPTION

FIG. 1 schematically shows an overview of the steps of the method according to an embodiment of the invention. A user starts an online conference on a collaboration tool using one device (e.g. a first device) of his/her plurality of devices. For instance, the device that is used by the user to initiate the conference can be a first device of the plurality of devices of the user. The user can also have a second device of the plurality of devices as well.

Each of the different devices of the user (e.g. the first device, the second device, etc.) can include hardware. The hardware can include a processor connected to non-transitory memory and at least one transceiver. An operating system (OS) and at least one collaboration tool of the device can be defined by code stored in the memory of the device that can be run by the processor of the device. The collaboration tool of the device can be configured to facilitate use of the device in a collaboration session, which can be a communication session that can be transferred from the user's first device to the user's second device. The collaboration session can be a video call, a video conference, an audio call, an audio conference, or other type of collaboration session, for example. Such a session can include communications exchanged with other devices of other users that may be hosted by a host device that is connectable to the devices of the session participants via at least one network. The host device can be a type of computer device (e.g. a conference call server, a video conference server, a collaboration session hosting device, etc.). The host device can include a processor connected to non-transitory memory and at least one transceiver and be configured to facilitate the communications between the devices of the participants for the session.

The user devices (e.g. the first device, second device, etc.) can include input devices, output devices and/or input/ output devices. For example, each device can be communicatively connected to (or include) a pointer device (e.g. a mouse or stylus), a touch screen, a speaker, a microphone, a keyboard, at least one button, a keypad, or other type of input device, output device, or input/output device.

The initiation of a conference may be performed via an application or a web browser, using real-time communication protocols like WebRTC for video and/or audio streams. For the present example, the use of a collaboration tool can include utilization of a server that may support a collaboration service that can be provided via running of the collaboration tool. However, in the meaning of the present invention, no server may be involved, for example, in peer-to-peer communication sessions (e.g. no intermediate host device may be needed to host a collaboration session).

In step S100, the first device can initiate a conference session by sending a session initiation request to the collaboration tool. During the conference, the user may want to switch from one device to another, because, for example, (i) he/she arrived at the office and wants to switch to the desktop computer, or (ii) because he/she wants to walk the dog or run some errands and thus wants to switch to the user's mobile phone or smartphone, and/or (iii) because the battery of the first device runs low and it is desired to switch to the user's second device. In step S200, the session is transferred to the second device of the user which is performed by the collaboration tool's interface. A session transfer request is sent to the collaboration tool. The tool may recognize the second device by a unique identifier (ID) or token which has been registered to the user's account associated with the collaboration tool.

A token can be a digital object used for authentication, authorization, or access control in various systems and applications. Tokens are typically used to prove the identity of a user, device, or entity without revealing sensitive information like passwords or personal details. A characteristic of tokens is their ability to securely represent and transmit information without exposing sensitive data. A token can help ensure the security and privacy of users and systems in various technological applications.

After a period of inactivity, the operating system (OS) of the first device may automatically lock the first device in step S300 to preserve security and privacy. Preferably, this step may also be performed by the user himself/herself. Locking of the first device may be done using the OS's built-in application programming interface (API).

Upon installation or first use, the collaboration tool on the first device may request a unique device key from the OS's API. The OS may generate a unique device key, associating the application with the device. The device key may be an encrypted string that ensures secure communication between the application and the OS. The request may include the application ID, the user ID, and other relevant metadata. These metadata may comprise metadata for device identification (e.g. user agent string identifier, browser canvas fingerprint). Also, the metadata may comprise metadata for enhancing security measures like user settings (details about security and privacy configurations), WebRTC details (data about peer-to-peer connections which may be critical if the tool uses WebRTC for real-time communication), or recent activity logs (monitoring actions may help detect and prevent unauthorized changes or access). The algorithm used for key generation may vary, but it should ensure that the key is random, unique, and secure. The OS may then associate the generated unique device key with the collaboration tool on the respective device. This association may be stored securely in the OS's memory or a secure database. The OS may communicate the device key back to the collaboration tool through a secure API response. The collaboration tool may store the device key securely for future communication with the OS and its API.

In step S400, the collaboration tool sends the device key to its server hosting a service of the collaboration session that may be utilized via the collaboration tool, where it is associated with the user's account. This registration step may involve secure communication over HTTPS and may include additional security measures such as encryption or hashing of the device key. According to the invention, the device key allows the collaboration tool to authenticate itself to the OS, to the collaborations tool's server, and vice versa. This ensures secure communication and operation of the tool on the device, enhancing the security and reliability of the user's interactions with the collaboration tool.

In the next step S500, the first device is unlocked using biometric authentication. This may be done by the collaboration tool integrating with the OS's unlocking mechanism through APIs. When the user intends to transfer the conference back to the first device, he/she can unlock the device using built-in mechanisms such as fingerprint scanning or facial recognition as described above. These mechanisms may be backed by security standards like Fast Identity Online (FIDO) protocols for secure authentication. First, the user may initiate the unlocking process through the collaboration tool's interface on the second device. The user may be prompted to unlock the first device using its biometric unlocking mechanisms. In the biometric authentication request, the collaboration tool on the second device may send a remote unlock request to the first device via the server. This request might include the device ID, user ID, session ID, and possibly a one-time password (OTP) for added security. For biometric data collection, the first device, upon receiving the unlock request, may activate the required biometric sensor (like fingerprint scanner or facial recognition camera) to collect the user's biometric data. Once the user provides the required biometric data, the data may be processed using the biometric authentication mechanism of the OS. This mechanism matches the scanned biometric data with the biometric templates stored securely on the device during the initial setup. The authentication mechanism may return the result of the match process back to the collaboration tool. If the biometric data matches the stored templates, the authentication is successful, and the device is unlocked. The result, which may be in the form of an encrypted token or a binary success/failure flag, may then be passed back to the collaboration tool via the OS's API.

Upon successful unlocking, the collaboration tool communicates the result back to the server, which then initiates the transfer of the conference session back to the first device which will be described later.

The actual biometric data may not be transmitted or shared with the collaboration tool in some embodiments. Instead, the authentication process can be handled entirely within the device, which can help ensure the security and privacy of the user's biometric data. In short, the collaboration tool can have an implementation using the OS's API facilities, but it may not manipulate sensitive unlocking authentication data which is present in the first device.

In step S600, an automatic transfer of the session can be triggered by the collaboration tool. Unlocking of the first device is notified to the collaboration tool by the OS's API, whereupon the collaboration tool may send a session transfer request to the server. The transfer request may include the session ID, the device key of the first device, and the user's authentication token. It may also include a timestamp and an OTP for added security. The collaboration tool may prepare a session transfer request for the server. The collaboration tool may send the session transfer request to the server using a secure communication protocol, such as HTTPS. This ensures that the requested data is encrypted during transit and prevents interception or tampering.

The server receives the transfer request and processes it. This involves, in step S700, verifying the included data (session ID, device key, user's authentication token, OTP) and checking for any anomalies, such as discrepancies in the timestamp or invalid OTP. Once the server has successfully verified the transfer request, it may transfer the session to the first device in step S750. This step may also involve renegotiation of real-time communication protocols (like WebRTC) for seamless transfer of audio and video streams. Further, the transfer may involve updating the server's record of the current session, indicating that the first device is now the active device for the session. Finally, the server sends a notification to both the first and second device. The first device's collaboration tool receives a signal to begin the session, while the second device's collaboration tool receives a signal to end the session, maintaining the integrity of the single-session-per-user policy.

In the last step S800, the user continues the conference on the first device.

Thus, embodiments of the method and system can help ensure a secure session transfer between devices and enhances the user experience by enabling biometric unlock mechanisms to trigger a session transfer. Embodiments can be configured to also adhere to best practices of application security by using device keys, authentication tokens, and secure real-time communication protocols.

To illustrate embodiments of the method, apparatus, and system further, a short use case is provided:

User A is in a critical online meeting via his desktop computer (first device). An urgent delivery forces him to switch the meeting to his mobile phone (second device). Once he's free, he wants to switch back to his desktop computer. With the inventive method, user A initiates a seamless switch command on his mobile phone. The collaboration tool recognizes his desktop computer's biometric capabilities and prompts him to use the fingerprint sensor on his desktop computer. User A scans his fingerprint on his desktop computer's reader. Immediately, the desktop computer unlocks, and the meeting is smoothly transferred back from his mobile phone to his desktop computer. By its integration with the desktop computer's biometrics unlocking mechanism and the seamless active session transfer, a fluid and efficient user experience is ensured.

Figure 2:
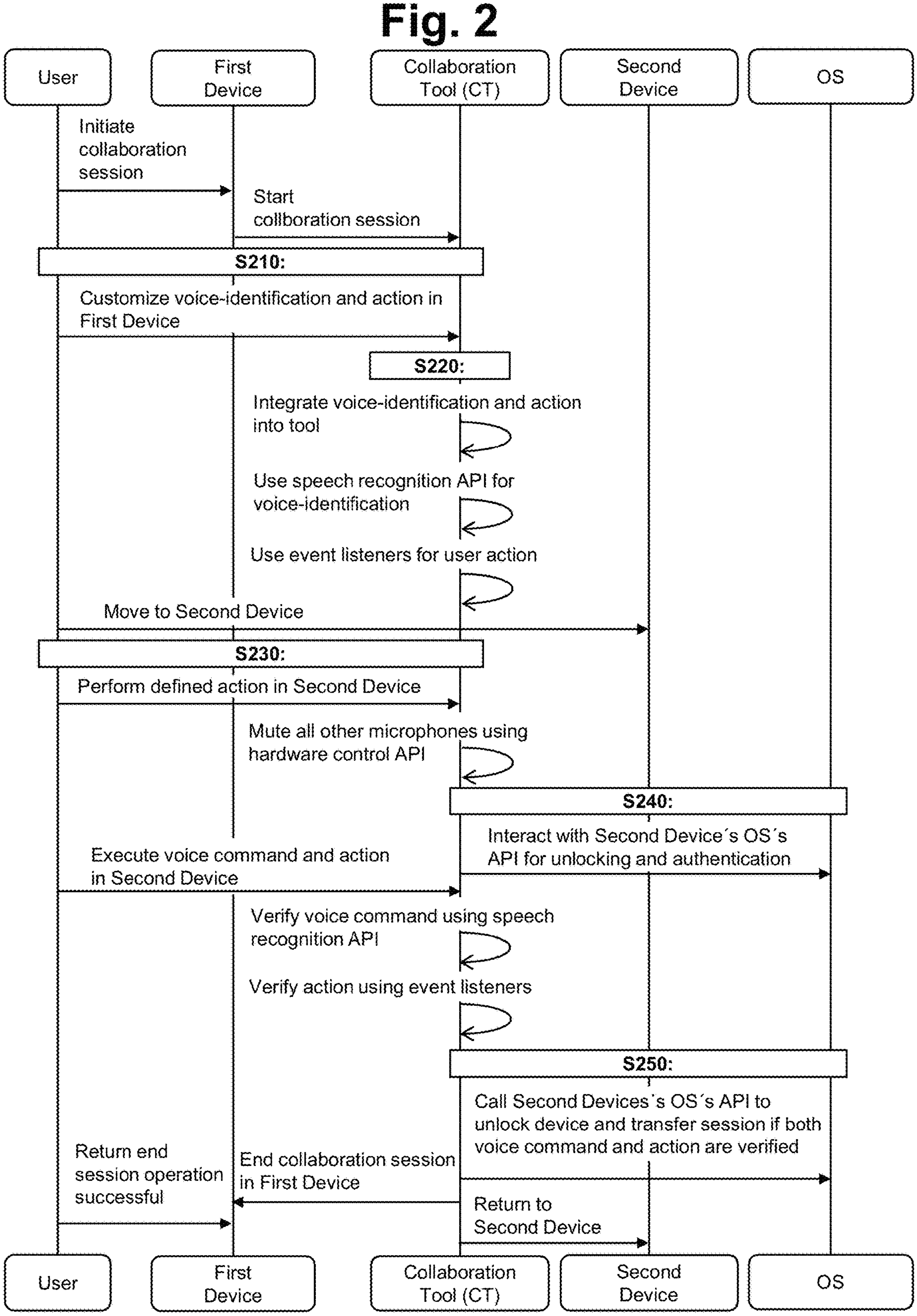
FIG. 2 shows a schematic sequence diagram of the method for automatic meeting swap according to another embodiment of the invention.

FIG. 2 schematically shows an overview of the steps of another embodiment of the method of the present invention. In this embodiment, the device that will be unlocked and have the collaboration session transferred to does not have a built-in unlocking mechanism with biometric authentication either by lack of support of these peripherals in the OS or due to them not being present. The embodiment depicted in FIG. 2 shows the unlocking and transferring of the session initiated by the first device of a user to the second device of said user as depicted in step S200 in FIG. 1.

In step S210, the user customizes a voice-identification feature and an action in his/her first device for unlocking said device and transferring a collaboration session. This step may involve recording a specific voice command and defining an action such as pressing a particular key sequence, moving the mouse, or performing a swipe.

In step S220, the customized voice-identification feature and action are integrated into the collaboration tool which may be an application or a feature in a web application's browser. This process may involve using speech recognition libraries or APIs to implement voice recognition within the collaboration tool. The customized voice command may be stored in a format in the collaboration tool that can be compared with future user inputs. Also, the customized action (key press sequence, mouse movement, swipe, etc.) may be integrated into the collaboration tool using relevant libraries or APIs that allow capturing user input. For instance, keyboard event listeners can be implemented for key presses, mouse event listeners for mouse movements, etc. In addition, the collaboration tool will need to have control over the device's microphones to mute all microphones of the respective device when the action event is performed, except for the one where the action event is being performed. For the collaboration tool to be able to mute those microphones in step S230 that are not involved in the action, all active microphones have to be identified by using an API provided by the OS or a third-party library that allows access to audio input devices. Then, among all the identified microphones, the one where the action event is being performed may be chosen to remain active. This may involve using user input, predefined system settings, or additional logic within the application to determine which microphone to keep active. For example, the collaboration tool may be designed to recognize specific user actions, such as a distinct swipe on a touchscreen or a double-click of a mouse, a key-press, etc., that indicate a preference for a particular device's microphone. Further, the devices may have preset configurations that prioritize one microphone over another, e.g. if a user typically uses Device A for voice commands, the system may default to Device A's microphone unless directed otherwise. Still further, the collaboration tool may incorporate logic to detect which device is currently in use or which device has been most recently active, and then select that device's microphone by default. For instance, if the user is actively typing or clicking on Device B, the collaboration tool may deduce that Device B's microphone should remain active during the transfer process. All microphones that are not to remain active, may then be muted using hardware control APIs. Depending on the OS and available APIs, this may involve setting the volume of the other microphones to zero, disabling the audio input from said microphones, or using other methods to prevent said microphones from capturing audio and interfering with the voice command to unlock the device. These other methods may comprise redirecting audio input to a virtual or null device, effectively silencing the microphone without physically turning it off. In addition, these other methods may comprise driver manipulation by temporarily disabling the microphone driver, priority setting by assigning a lower priority to certain microphones, ensuring that their input is ignored or overridden by the primary microphone, application-level muting by built-in functionalities of the collaboration tool which allows the collaboration tool to mute microphones from within the application, rather than relying on system-level controls, or applying digital filters that block incoming audio signals to the microphone making it non-responsive to sound.

In the next step S240, the collaboration tool interacts with the OS's API of the second device to execute the user's customized voice-identification feature and action for unlocking the second device. When the user speaks his/her voice command, customized in step S210, the active microphone on the device may capture said audio input. Said audio may be processed using a speech recognition library or API to convert the spoken command into text which in turn may be compared with the stored voice command defined by the user. If the spoken command matches the stored command, the voice identification is successful. Simultaneously, the user needs to perform the customized action (e.g. key press sequence, mouse movement, swipe, etc.) on the second device. The OS may continuously listen for said actions using the appropriate event listeners. If the action performed matches the stored action, the action identification is successful.

According to the present invention, the OS must verify both the voice command and the action simultaneously. Thus, the voice command and the action must both be correctly executed within a specific time frame for the verification to be successful. If both are not successfully executed within said time frame, the unlocking and session transfer process will not proceed. The time frame can be in the range of 30 seconds to 2 minutes, preferably 35 seconds to 1.5 minutes, more preferably 40 seconds to 1 minute and most preferably 45 seconds to 55 seconds. Of course, other embodiments may utilize other types of time frames or time ranges.

Upon successful verification of the voice-identification and action, the OS's API of the second device is called by the collaboration tool to unlock the device and transfer the collaboration session in step S250. Thus, an alternative unlocking mechanism for devices that do not support biometric authentication due to lack of hardware or OS support can be provided with some embodiments.

For a further illustration of the embodiment, a short use case is provided:

User B often begins her collaboration sessions on her tablet due to her need to move around the house. When she settles into her home office, she prefers to continue said sessions on her desktop personal computer (PC) for its enhanced functionality. Previously, transferring the session from her tablet to her already logged-in desktop PC disrupted the flow of the meeting. She had to manually unlock her desktop PC and then navigate within the collaboration tool to take over the session from her tablet. With the inventive collaboration tool's voice-identification feature, user B can smoothly transfer the active session from her tablet to her desktop PC. She does so by saying the customized voice command "Transfer session to PC", followed by a specific, also customized action which is in the present case pressing the 'Enter' key twice on her PC's keyboard. This combination of voice command and key press, unique to user B, ensures that the transfer is secure. To assure that other participants do not hear user B's voice command, a series of techniques may be applied. When user B initiates the "Transfer session to PC" action (in the present example pressing the "Enter"-key twice), the system may start buffering the audio locally without transmitting it. Once the command is completed, the buffer may be cleared without sending its content to the collaboration tool. This way, the audio data remains on the local device and is never shared. The system may further comprise multiple audio channels, one dedicated for voice commands and another for regular communication. The voice command channel only listens and acts locally while the communication channel handles audio for the collaboration tool. The collaboration tool may still further comprise a feature that mutes outgoing audio when it detects a predefined voice command initiation (like "Transfer session"). While the outgoing audio to the collaboration tool is muted, the local system may still listen to complete the command. Yet still further, the collaboration tool may be deeply integrated with the device's OS. When a voice command is initiated, the OS may temporarily suspend audio transmission to the collaboration tool until the command is completed. Therefore, during the transfer of the session using voice command and user action, all other device microphones are muted to prevent any audio interference. Thus, the embodiment can provide an improvement of user B's productivity by maintaining the continuity of the meeting.

Figure 3:
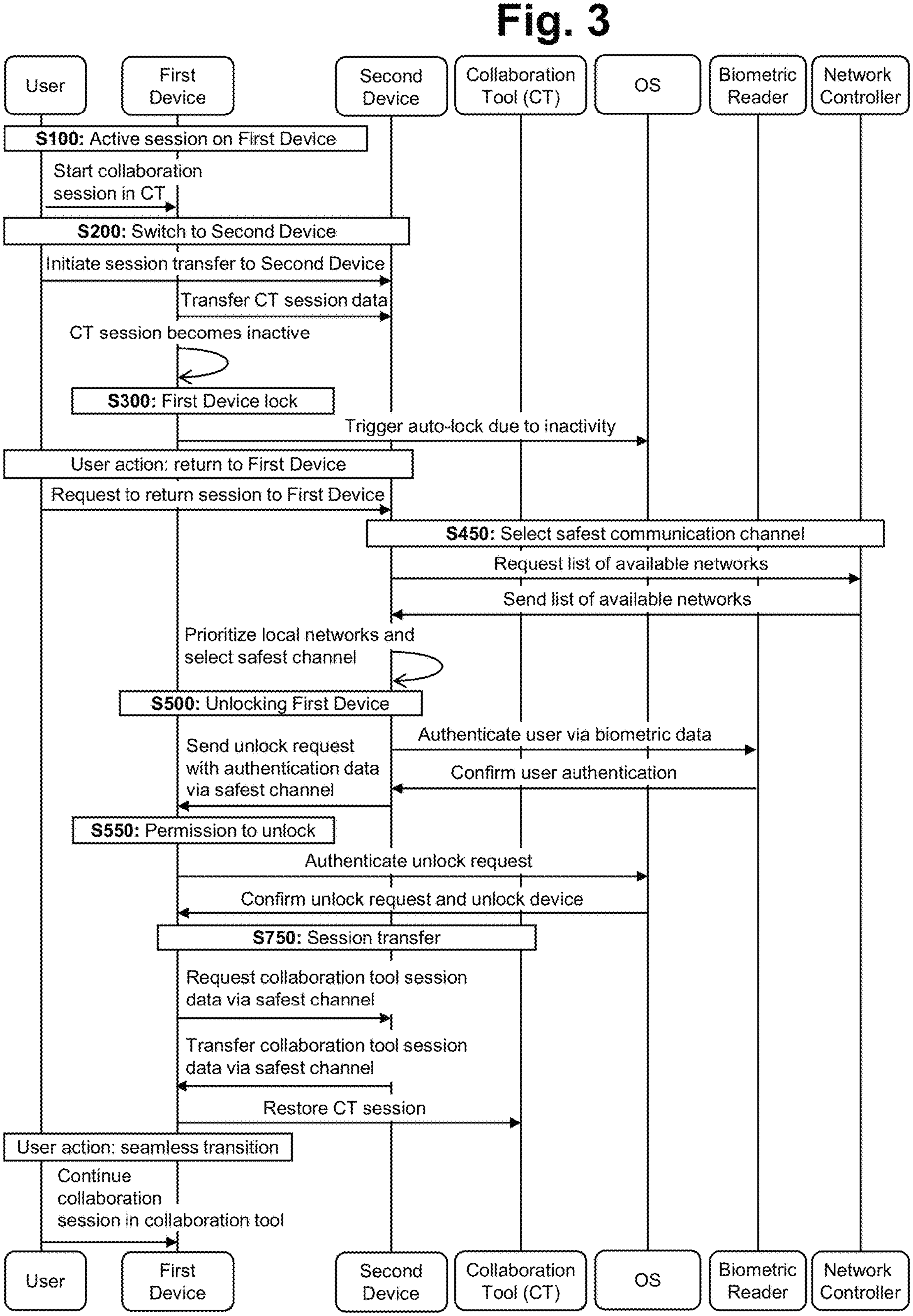
FIG. 3 shows a schematic sequence diagram of the method for automatic meeting swap according to yet another embodiment of the invention.

FIG. 3 shows a schematic sequence diagram of the method according to another embodiment of the invention. In step S100, a user initiates an active session on a collaboration tool, such as a conference call, with his/her first device. During the session, the user wants to switch the active collaboration session to a second device. This is performed in step S200 by transferring the active session from the first to the second device of the same user. Due to a period of inactivity or a manual action by the user, the OS on the first device locks said device to preserve security and privacy in step S300. In the ongoing meeting, the user wishes to switch back to the first device again. In the embodiment depicted in FIG. 3, the user is able to unlock the first device with the biometric unlocking mechanisms of the second device and transfer the collaboration tool session back to the first device in a seamless action.

This is done first in step S450, in which the collaboration tool identifies the most secure communication channel to transfer the session. This includes encryption security to protect the data being transferred. The secure communication channel ensures that the data being transferred between devices is protected from unauthorized access or tampering. According to the present invention, local communication channels, such as Wi-Fi or Bluetooth, may be prioritized when the first and second devices are in the same network or paired. Thus, reliance on internet-based channels may be reduced and increased speed and security may be offered. Channel prioritization may involve choosing the most appropriate communication channel based on factors like security, speed, and availability. As already mentioned above, according to the present invention, local communication channels (like Wi-Fi or Bluetooth) are preferred over internet-based channels when the first and second devices are in the same network or paired. The devices may use network discovery protocols and APIs provided by the device's OS to detect available networks and communication channels. For example, Network Discovery in Android and Bonjour in iOS and macOS. For Bluetooth, the devices may verify that they are paired using the Bluetooth APIs provided by the OS to check for paired devices. The devices may also consider the strength of the available networks. For example, Wi-Fi signal strength can be determined using the RSSI (Received Signal Strength Indication) value, and Bluetooth signal strength can be determined using the RSSI or LQI (Link Quality Indicator) values. In addition, the devices may verify the security of the available channels by checking whether the Wi-Fi network is protected with WPA2/WPA3, or whether the Bluetooth connection is using Secure Simple Pairing (SSP) or a similar secure method. For channel selection, the devices may use an algorithm to choose the most appropriate channel based on the available options and their properties. For example, the algorithm might prioritize local channels (Wi-Fi or Bluetooth) over internet channels, and secure channels over unsecured ones. If multiple local channels are available, it may choose the one with the strongest signal.

Embodiments can also provide a fallback mechanism, if the preferred local channels are not available or suitable, for example, if the signal is too weak, or the channel is not secure. In this case, the devices may switch to an internet-based channel using APIs provided by the OS to establish an internet connection, and secure communication protocols like HTTPS to ensure the security of the data being transferred. Once a session has been started on one channel, the devices may need to switch to a different channel if the conditions change. For example, if the user moves out of range of the Wi-Fi network, the devices might need to switch to using an internet-based channel using APIs provided by the OS to detect changes in network availability or signal strength, and to establish a connection on the new channel.

In the next step S500, the first device is unlocked by the collaboration tool using the biometric unlocking features of the second device, such as fingerprint scanner or face recognition as mentioned above. As already mentioned above, the present invention thus provides a secure way to authenticate the user's identity before unlocking the first device. In addition to biometric authentication, the collaboration tool must also have permission to unlock the first device. This may be achieved via an API that allows applications on the second device to send unlock requests to the first device. According to the present invention, the OS of both the first and second device may provide APIs that allow an application to request and receive permissions to control device locking and unlocking. These APIs may be provided by the system developers, such as Microsoft for Windows, Apple for macOS and iOS, or Google for Android. An example is OAuth (Open Authorization) which is an open standard for token-based authentication and authorization that can be used to grant an application specific permission without providing the application with the user's password. The application on the second device may use OAuth to request the specific permission to unlock the first device. Once the user grants permission in step S550, the OAuth service may provide the collaboration tool with an access token. This token represents the granted permission and may be used to perform API requests on behalf of the user. Upon receiving the access token by the collaboration tool of the second device, it may be securely stored to prevent unauthorized access. This may be performed using the secure storage APIs provided by the device's OS, such as the Android Keystore system on Android devices, or the Keychain services API on Apple devices. When the collaboration tool uses the access token to make API requests, said requests need to be secured to prevent interception. This may involve using secure communication protocols such as HTTPS. In the meaning of the present invention, the permission to unlock the first device may also be granted without user intervention. This may be done using, e.g. network-based authentication.

Embodiments may also be configured to provide a way for the user to revoke permissions if necessary. This may involve providing a user interface that allows the user to view and manage the permissions he/she has granted, as well as APIs that allow an application to programmatically revoke permissions. This flow ensures that the collaboration tool on the second device can only unlock the first device and transfer the session if the user has explicitly granted it the necessary permissions, providing a secure method of permission management.

In step S750, the session is transferred back to the first device after unlocking of the first device. This step may be facilitated by the collaboration tool's server, which manages active sessions and can move a session between devices by creating, maintaining, and ending sessions. This may be accomplished using a combination of cookies, session IDs, and server-side storage. In the meaning of the present invention, session cookies and session IDs are unique identifiers assigned to a specific session. They are usually stored in a cookie on the user's device or sent in the HTTP header. The collaboration tool may use the session ID to identify the correct session to transfer. Also, the server (e.g. host device for the collaboration tool or collaboration session) can maintain a record of active sessions in server-side storage, such as a database or in-memory data storage of the server. When a session needs to be transferred, the server can use the session ID to look up the session details.

The collaboration tool on the first device may use APIs provided by the device's OS to accept the incoming session data and resume the session. Once the session has been transferred, the state of the session on the two devices needs to be synchronized. The collaboration tool on the second device needs to end the session or switch to a passive mode, while the tool on the first device needs to take over the active session.

Figure 4:
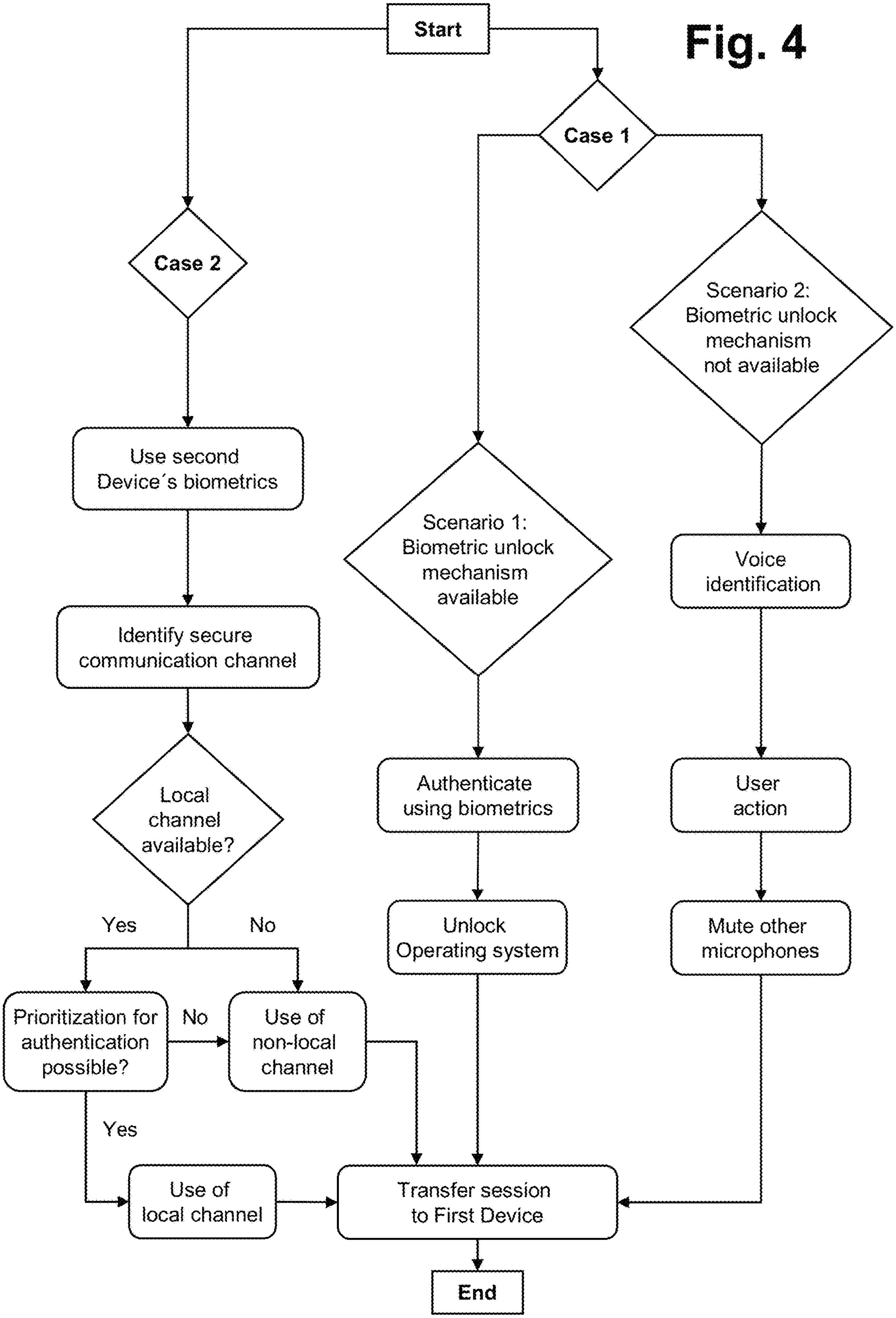
FIG. 4 shows a flowchart of the method for meeting swap according to different embodiments of the invention.

FIG. 4 shows a flowchart of an overview of some of the steps of the different embodiments of the present invention depicted in detail in the previous figures. The flowchart starts with Case 1 and Case 2. In Case 1, Scenario 1 and Scenario 2 are provided. Scenario 1 involves the use of a built-in biometric unlocking mechanism for authentication and unlocking. In step 1, authentication is provided by using the user's biometrics. In step 2, the device is unlocked using the OS of said device. And finally, in step 4, the collaboration session is transferred to the first device.

Scenario 2 involves using voice identification and a user action as a biometric unlocking mechanism is not available. Thus, in step 1 of Scenario 2, a voice identification is performed, followed by a user action in step 2. Other microphones of the device that are not involved in unlocking of said device are muted in step 3. Also, this Scenario ends with the transfer of the collaboration session to the first device in step 4.

In Case 2, the second device's biometrics are used to authenticate the user in step 1. Further, a secure communication channel is identified in step 2. Depending on whether a local channel is available, it has to be evaluated in step 3, if the local channel can be prioritized for authentication or not. If the local channel offers sufficiently secure encryption methods, it is used, if not, the local channel is not deemed secure enough and a non-local channel may be used instead. This may arise, for instance, when the user is connected to a less secure home network. Regardless of the availability of a local channel, the session is transferred back to the first device in step 4.

The flowchart in all cases ends when the session has been successfully transferred to the target device.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should also be appreciated that different embodiments of the method, communication system, communication apparatus, and non-transitory computer readable medium can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for automatic meeting swap, comprising:
initiating, by a first device of a user, a collaboration session,
transferring, by a collaboration tool, the collaboration session to a second device of the user,
locking, by an operating system (OS) of the first device, the first device,
registering, by the OS, the collaboration tool with a device key,
triggering, by the collaboration tool, a transfer request for transferring the collaboration session from the second device to the first device,
selecting a communication channel for communications between the first device and the second device based on a pre-defined priority scheme so a local communication channel is selected;
the second device receiving biometric data of the user and sending the biometric data of the user to the first device to unlock the first device;
the first device verifying that the biometric data of the user received from the second device matches the biometric data of the user stored locally on the first device;
the first device unlocking after the biometric data of the user received from the second device is determined to match the biometric data of the user stored locally on the first device;
verifying, by the collaboration tool, the transfer request,
transferring, by the collaboration tool, the collaboration session from the second device back to the first device, in case the transfer request is verified;
continuing the collaboration session on the first device.

2. The method according to claim 1, wherein the biometric data of the user received by the second device is encrypted for transmission of the biometric data of the user to the first device.

3. The method of claim 1, wherein a biometric unlocking mechanism of the second device, which uses biometric features of the user, is utilized to collect the biometric data of the user.

4. The method of claim 3, wherein the biometric unlocking mechanism is built-in the second device.

5. The method of claim 4, wherein biometric features of the user are selected from facial recognition, fingerprint scan, iris scan, retina scan, hand geometry, ear recognition, palm vein recognition, finger vein recognition, voice recognition, and gait recognition.

6. The method of claim 5, wherein voice recognition is additionally performed with an action of the user.

7. The method of claim 6, wherein the user action is selected from pressing one or more key(s), moving a pointer device, swiping, tapping on a touch screen, rotation, clicking of at least one pointer device button, gesturing with hand or fingers, blinking the eyes, or tilting.

8. The method of claim 1, wherein the local communication channel is a local area network connection channel.

9. The method of claim 1, wherein the biometric data includes a recording of a voice command issued by the user and recorded via a microphone of the second device, the method also comprising:
muting the collaboration session prior to receiving the biometric data from the user to subsequently initiate the recording of the voice command.

10. The method according to claim 9, wherein the local communication channel is a Wi-Fi channel or a Bluetooth channel.

11. A system for automatic meeting swap, comprising:
a first device of the user and a second device of the user,
the first device having a processor connected to a non-transitory memory and at least one transceiver, the second device having a processor connected to a non-transitory memory and at least one transceiver,
the first device and the second device configured to be communicatively connectable to perform the automatic meeting swap such that a collaboration session is transferrable from the first device to the second device, the first device is subsequently locked via an operating system (OS) of the first device, a collaboration tool of the collaboration session utilized for initiation of the meeting swap is registerable with a device key, the first device is subsequently unlockable via the OS of the first device and the collaboration tool is triggerable in response to the unlocking of the first device to send a transfer request for transferring the collaboration session from the second device to the first device such that the transfer request is verifiable and the collaboration session is transferrable from the second device back to the first device after the transfer request is verified.

12. The system according to claim 11, wherein the first device and the second device each includes at least a first interface.

13. The system according to claim 12, wherein the first interface is an Application Programming Interface (API).

14. A method for automatic collaboration session swapping, comprising:
initiating, by a first device of a user, a collaboration session,
transferring, by a collaboration tool of the first device, the collaboration session to a second device of the user so that the collaboration session is transferred from the first device to the second device,
registering a device key for the collaboration session,
selecting a communication channel for communications between the first device and the second device based on a pre-defined priority scheme so a local communication channel is selected;
the second device receiving biometric data of the user and sending the biometric data of the user to the first device to unlock the first device;
the first device verifying that the biometric data of the user received from the second device matches the biometric data of the user stored locally on the first device;
the first device unlocking after the biometric data of the user received from the second device is determined to match the biometric data of the user stored locally on the first device;
triggering a transfer request for transferring the collaboration session from the second device to the first device, the transfer request including the device key,
transferring the collaboration session from the second device back to the first device after the transfer request is verified via the device key, and
continuing the collaboration session on the first device.

15. The method of claim 14, wherein the transfer request also includes a session identifier for the collaboration session.

16. The method of claim 14, wherein the device key includes an encrypted string.

17. The method of claim 14, wherein the collaboration session is hosted by a host device that is communicatively connectable to the first device and the second device, and the transfer request is sent to the host device.

18. The method of claim 17, wherein the first device has a collaboration tool that is utilized for communications with the host device.

19. The method of claim 18, wherein the second device has a collaboration tool that is utilized for communications with the host device.

* * * * *